Dec. 28, 1965 J. F. DOVE 3,226,696
DATA STORAGE AND RETRIEVAL SYSTEM
Filed March 23, 1962 2 Sheets-Sheet 1
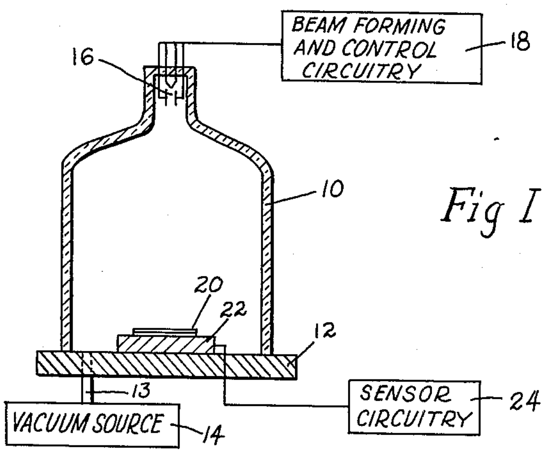
Fig I
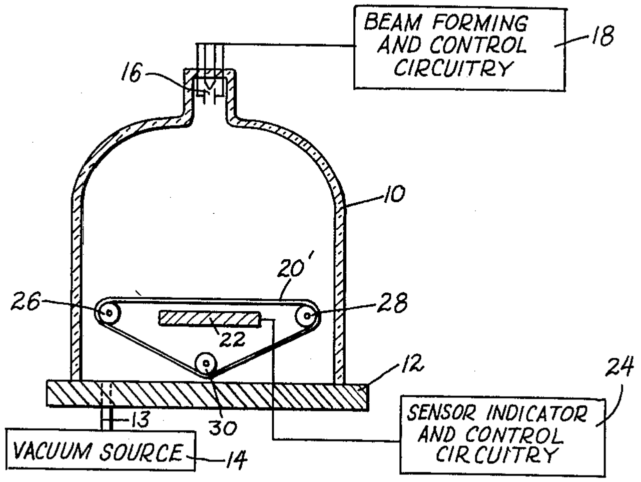
Fig II
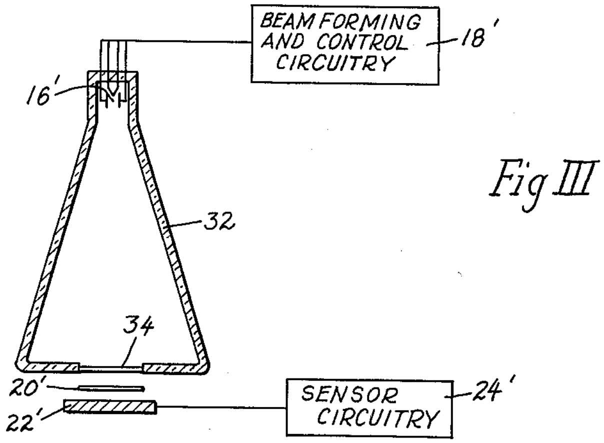
Fig III
JOHN F. DOVE
INVENTOR.
BY Robert O. Wright Dec. 28, 1965 J. F. DOVE 3,226,696
DATA STORAGE AND RETRIEVAL SYSTEM
Filed March 23, 1962 2 Sheets-Sheet 2
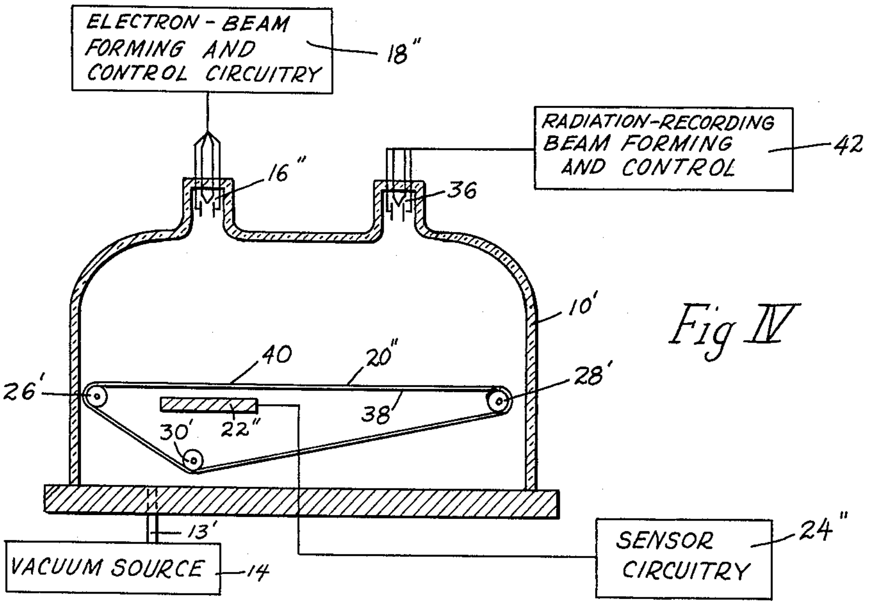
Fig IV
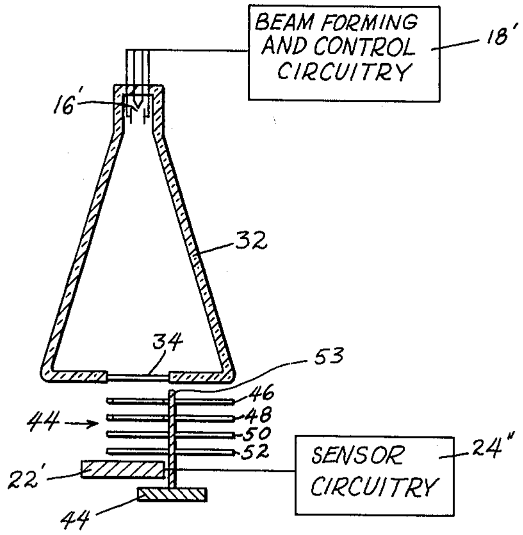
Fig V
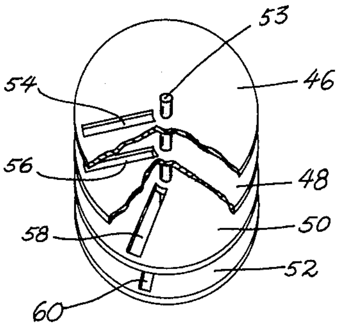
Fig VI
JOHN F. DOVE
INVENTOR
BY Robert O. Wright
ATTORNEY 3,226,696
Patented Dec. 28, 1965

3,226,696
DATA STORAGE AND RETRIEVAL SYSTEM

John F. Dove, Overhill Drive, Rome, N.Y.

Filed Mar. 23, 1962, Ser. No. 181,968
3 Claims. (Cl. 340—173)

This invention relates to high density and high speed data recording, storage, readout and display methods and apparatus. More particularly, this invention relates to ultra-high density recording and readout systems involving high energy electrons or particles, radiation and the like, in one or both portions of the complete cycle.

Throughout today's industrial and military establishments of the world, our galloping technological revolution has created a seemingly insatiable demand for recording, storage, readout and display of data of all types and forms. Current methods of storing data on magnetic films, tapes, drums, wire, paper tape, cards and other storage devices, are rapidly becoming obsolete both in terms of total capacity and in terms of time to record and readout. Various refinements are being incorporated in the currently known mediums such as magnetic storage devices and paper storage devices to improve the storage capacity and access times, but to meet the requirements of the coming decade, major increases of several orders of magnitude in all categories will be required.

Accordingly, it is an object of the present invention to provide an ultra-high density storage and readout method and apparatus which will increase storage densities and access time by several orders of magnitude over presently existing devices. It is another object of the present invention to provide an ultra-high density, ultra-high speed recording, storage, readout and display device in which the data may be permanetly stored if desired. It is another object of the present invention to provide an ultra-high density, ultra-high speed recording and reproducing system that can display the information contained therein by means of a static reproduction system. It is another object of the present invention to provide a high density storage and readout system in which the write time and access and readout times are extremely short. It is another object of the present invention to provide an ultra-nigh density storage and readout system in which various types of readout methods may be employed to retrieve the information stored therein, depending upon the access time required, speed of readout, and so forth. It is another object of the present invention to provide an ultra-high density and high speed data recording and reproducing system utilizing a very narrow beam of high energy electrons or particles to cause a change in the properties of a recording medium which may be later observed by another beam of electrons, particles, radiation or the like. It is a still further object of the present invention to provide an ultra-high density, ultra-high speed recording and reproducing system in which a variety of recording media can be used, and in which a highly flexible system of recording and reproducing may be employed. These and other and further objects will be in part apparent and in part pointed out as the specification proceeds.

In the drawings:

FIGURE 1 is a diagrammatic view of an embodiment of the present invention utilizing a thin film card and high energy beam in a vacuum;

FIGURE 2 is a diagrammatic view similar to FIGURE 1 of an embodiment utilizing a tape type storage medium;

FIGURE 3 is a view similar to FIGURE 1 of another embodiment wherein the storage medium is external of the electron source;

FIGURE 4 is a view similar to FIGURE 1 wherein a radiation beam is provided to record and a low energy electron beam to read out;

FIGURE 5 is a view similar to FIGURE 3 showing another embodiment of the invention; and FIGURE 6 is a view partially cut away taken on line VI—VI of FIGURE 5.

Referring now to FIGURE 1, there is shown in diagrammatic form one embodiment of the present invention. In this embodiment the ultra-high density storage system consists of a bell jar 10 or similar evacuated chamber having a removable but sealable base 12; a source of vacuum 14 connected thereto at 13; a source of electrons 16 capable of both high and low energy emissions together with appropriate beam forming and control elements such as deflection and focusing plates, coils and the like (not shown as they are conventional in electron microscope and electron cutting technology); beam control circuitry shown at 18; a thin film recording medium 20 illustratively shown as a card about two inches by two inches; a sensor element 22 and sensor control and display circuitry 24. A detailed description of the electron source and the beam forming and control circuitry is believed well known in the art and has been omitted for simplicity and clarity of presentation of what is new in this invention. A detailed discussion of cathode ray tube type devices particularly as applied to electron microscopy may be had in "Electron Optics and the Electron Microscope," Zworykin et al., John A. Wiley & Sons, New York (1945) and particularly Chapter 2.

A further detailed discussion of high and low energy emissions suitable for record cutting and reading respectively may be had in the above reference at Chapters 4 and 5 and U.S. Patent 2,793,281 to K. H. Steigerwald.

In operation in the record cycle the high energy electrons 16 are focused and accelerated by the elements (not shown) into a very narrow, high voltage beam which is directed to impinge on card 20. Control circuitry 18 will direct the beam to the desired portions of card 20 in the proper sequence and the high energy electron beam will pierce or drill a hole in the thin film card. A series of holes will be recorded in accordance with the information to be stored on card 20.

For the readout cycle the electron beam voltage is reduced so that relatively low energy electrons are emitted and formed into an identical narrow beam. This beam is then scanned over card 20 in the same pattern as on the record cycle and wherever a hole was drilled on record the low energy electrons will strike the sensor 22 and through circuitry 24 so indicate. This indication can then be utilized in any well known manner.

The electrons source 16 may be any conventional type such as currently available in the CRT art. The beam forming and control elements and circuitry may be that of the electron microscope art, the principles of electron optics applying equally. Base 12 is provided with a suitable seal (not shown) with jar 10 so that a suitable vacuum 14 on the order of $10^{-4}$ to $10^{-7}$ millimeters of mercury can be readily maintained by a conventional vacuum pump. Alternatively, jar 10 can be filled with an inert gas which for some applications is desirable. Card 12 is a thin film of metal such as steel, aluminum or other alloy having suitable low thermal conductivity and coefficient of expansion. The thickness of the film, which is normally self supporting, may vary from one to five microns. The exact thickness will depend on the particle or radiation being used to drill the hole since it must be thick enough to slow or stop the beam or radiation in order to work the film material. Sensor 22 may take the form of a secondary emission device such as an electron multiplier which will detect the impact of even a few electrons. Appropriate scanning, gating and control circuitry is provided in the circuitry shown diagrammatically at 18 and 24. For a detailed discussion of an electron multiplier tube as a code readout device see Bell System Technical Journal for the months of September 1958, January 1959 and March 1959.

Referring now to FIGURE 2, the card 20 has been replaced by a tape recording medium. In this embodiment an endless tape 20' is mounted about spindles 26, 28 and 30 and driven by any conventional means (not shown). The tape may be a suitable plastic such as Mylar, having thereon a thin metallic film, illustratively, one micron in thickness. The high energy electrons from source 16 will then make holes in the metallic film which can then be sensed by sensor 22 and a low energy electron beam as before.

FIGURE 3 shows another embodiment utilizing what is known as a Lenard type tube 32. This tube is similar to a conventional CRT with an electron source 16' sealed in a vacuum therein. A small window 34 is provided in the face plate which, however, is thin enough to allow transmission of electrons but still maintain the necessary vacuum within the tube. A suitable material for such a window can be titanium. For a detailed treatment of the Lenard type tube reference is made to page 688 of Zworykin reference above and Physical Review, Vol. 24, 1924. If the electrons of the beam are of sufficient velocity, attenuation through window 34 is negligible and card 20' can be drilled as before. The balance of the system is comparable to that of FIGURE 1 and functions in much the same manner. In this embodiment however, it may be desirable to use a separate source of electrons for the sensor function.

FIGURE 4 is another embodiment of the present invention in which a modified bell jar 10' is used. A source of radiation 36, such as X-rays, is used to record on a tape medium 20'' at 38. The tape 20'' is mounted about spindles 26', 28', and 30' and driven in any conventional manner. A suitable vacuum is maintained by source 14'. A source of low energy electrons 16'' is provided in another portion of jar 10' and sensor 22'' is in alignment therewith. Records cut at 38 may thus be read out at 40 by the low energy electron beam and sensor 22''. Suitable control circuitry of conventional design is provided at 18'', 24'' and 42.

Present-day electron beam cutting machines or machines based on electron microscope principles which could be used as the source of the high-speed narrow beam of electrons can cut a hole in a film three to ten microns thick on the order of one to five microns in diameter, with a tolerance of plus or minus 50 percent. These holes can be drilled in the order of microseconds and can be spaced apart approximately one hole diameter. See paper by R. Castaing, Proceedings of International Conference on Electron Microscopy, 1949. In this configuration a storage density of $10 \times 10^7$ bits per square inch is obtained and a random access time of .01–1.0 microsecond can be realized if a recording medium form of cards or plates is used.

The foregoing specific illustrative examples are typical of the values that could be achieved today with existing devices. It should be understood that variations can be applied, as will be described hereafter, which will greatly increase not only the storage capacity but the access time and read and write times. Perhaps the most obvious variation would be not to completely drill or cut holes in the recording medium but to merely modify the medium by drilling a partial hole or perhaps modifying the opacity of the media to particles or electrons or to utilize X-rays or other high energy particles to cause a change in the physical properties of the recording medium rather than cut a hole therethrough. For instance, the electron beam could be used to remove a thin layer on a transparent backing or X-ray opaque surface which would then permit reading by scanning with an electron beam, light or X-ray as the case may be. This would speed up the drilling or cutting procedure for a two micron hole, for instance, from microseconds to nano-seconds. Still further, an electron beam might be used to produce thermal stresses of sufficient magnitude that localized plastic flow would occur in a proper plastic medium which would produce noticeable changes in X-ray or other radiation therethrough and hence comprise a readable record that could be read out and displayed as desired. Further, the electron beam could be used to remove an anti-etchant, for instance, or other chemical substance which would then permit development similar to present day printed circuitry techniques to develop the record to a suitable permanent record that could be properly read and displayed as desired.

In FIGURES 5 and 6 there is shown an embodiment in which storage capacity, speed and flexibility are aided by the provision of a stack 44 of discs which is utilized as the record medium. Discs 46, 48, 50 and 52 are illustratively rotatably mounted on a spindle 53 and carry therein radial slots 54, 56, 58 and 60. Discs 46–52 are operatively interconnected so that when it is desired to record or read on disc 48, disc 46 is positioned so the beam will pass through slot 54. The other discs may be reached in a similar manner so that while only one disc at a time is utilized, the total storage capacity and access times are greatly increased.

In addition to the foregoing, radiations of the Maser and Laser types may be used for the recording function. In any particular system the exact source of the beam of particles or radiation would be chosen for the particular record material to be used and the application desired, while the density requirements and speed of access would affect the form and material used in the recording medium. The requirement that the memory system have an erasable capability would dictate some form of material that could have the change removed, such as the stress in the thermal plastic, which could be removed by suitable heating or curing. Chemical means could also be used for instance for restoring or removing changes in a thin film on a base plate.

In the readout or display aspect of this system, in addition to low energy electron beam scanning of the perforations as shown in FIGURES 1–4, other means can be used without departing from the scope of the present invention. X-ray readout by using some form of radiation detection instrumentation to detect X-rays passed through the holes is feasible although somewhat slower. A light beam or separate low energy electron beam that would not affect the surface of the record can be used with suitable photoconductive or secondary emission sensors to provide readout independent of the recording apparatus. Secondary radiation, reflection, complex defraction, and interference techniques could also be used to readout a record produced by the high energy particle beam.

The sensing system, it should be recognized, can take one of a number of forms other than that shown, such as a relatively large surface or an array of small detector elements such as small electron multipliers which could be placed in an appropriate pattern to read the recorded data code. The sensor could also take the form of a capacitive, a magnetic, or micro-analyzer type of device.

By utilizing the same electron beam first in its high energy condition to do the recording and secondly in a low energy condition to do the readout, and thus not damage the record, the same device can be used for both readin and readout which overcomes many problems in aberrations caused by the particular beam deflection circuitry of the specific device being used. This permits even greater density of packing of information and hence greater storage capability with better accuracy than is possible with independent read-out beams.

The recording media which has illustratively been shown as a thin metallic film card or tape form may be made of any material that can be selectively, at least semi-permanently, altered in some physical aspect by a narrow beam of particles or radiation. In addition to steel, aluminum and similar alloys, semi-conductor material such as germanium and silicon can be used for the film. The thickness of the film will depend on the type of beam being used, whether it must be self-supporting and similar other system parameters. It can range from a few angstroms of thickness to several mils.

Recording media transport could be any suitable convenient transport similar to a tape recording mechanism or card punch system, depending on the particular requirements of the ultimate system and on the type of recording medium being used. This mechanism is omitted in FIGURES 1–4 for the sake of clarity.

It will become readily apparent from a consideration of the foregoing that by utilizing very narrow particle or radiation beam writing and readout and a medium that can be quickly and simply changed in some physical property capacities in the neighborhood of $10^9$ bits and random access times in the order of 10 to 100 nanoseconds, can be readily realized in a very practically sized package that can be easily and economically utilized in an operative data storage and retrieval system.

While there are given above certain specific examples of this invention and their application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

I claim:

1. A high speed, high density data storage and retrieval system comprising in combination a vacuum vessel; means for maintaining a vacuum therein; a source of electrons mounted in said vessel; beam forming means operatively associated with said source; a thin metallic film record medium mounted within said vessel; control means for selectively causing said electron source to emit high energy electrons; control means for directing said high energy beam of electrons on said record medium to remove selected portions thereof; control circuitry for causing said electron source to emit low energy electrons; control means for directing said low energy beam of electrons onto said record medium to read out the recorded information without damage thereto; and sensor and sensor control means for indicating the presence of changes in said record medium when illuminated by said low energy electrons.

2. A high speed, high density data storage and retrieval system comprising in combination a vessel; an energy source to produce a small diameter radiated beam positioned in said vessel; a metallic record medium mounted in said vessel in the path of said radiated beam; writing control means for selectively varying the intensity of said beam to directly remove at least a portion of said record medium; reading control means for selectively varying the intensity of said beam to illuminate said record medium without changing the physical characteristics thereof; and sensor and sensor control means for indicating the presence of changes in said record medium produced with said first control means, when illuminated by a low intensity beam produced under control of the second said control means.

3. In a data storage and retrieval system the combination comprising an electron source to produce a radiated beam having a diameter greater than one micron and less than five microns; a metallic data storage member having a thickness greater than one-half and less than ten microns disposed in the path of said beam; circuit control means for varying the intensity of said beam from a recording level sufficient to form holes in said data storage member to a reading level insufficient to change the physical characteristics of the data storage member; an electron sensing member positioned on the opposite side of said storage member from said electron source; and indicating means for showing the selective passage of electrons from said source through holes in said data storage member.

References Cited by the Examiner

UNITED STATES PATENTS

| | | | |
|---|---|---|---|
| 2,097,392 | 10/1937 | Finch | 346—74 |
| 2,786,156 | 3/1957 | Lorenz | 346—74 |
| 2,923,590 | 2/1960 | Lorenz | 346—110 |
| 2,985,866 | 5/1961 | Norton | 340—173 |
| 3,121,216 | 2/1964 | Wolfe | 340—173 |

IRVING L. SRAGOW, *Primary Examiner.*